Aug. 29, 1933.    G. G. MIZE    1,925,055
CHAIN
Filed Oct. 3, 1931
Fig. 1.
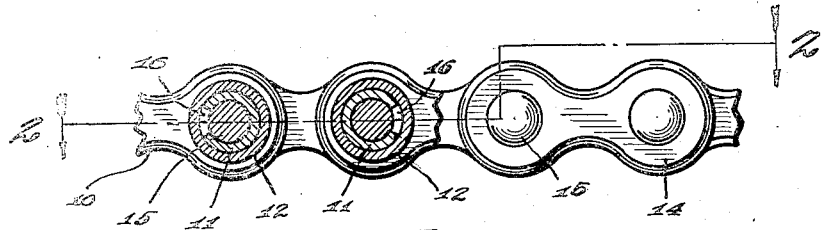
Fig. 2.
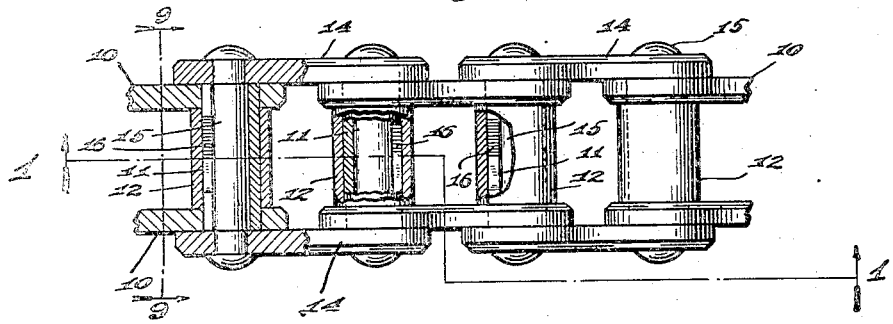
Fig. 3.
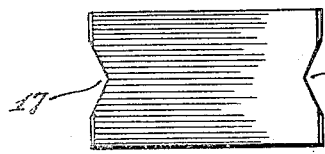
Fig. 5.   Fig. 6.
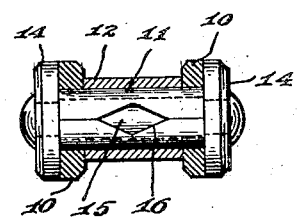
Fig. 4.
Fig. 9.
Fig. 7.
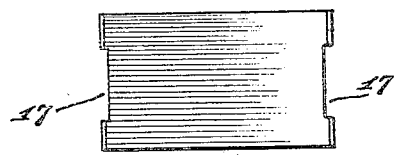
Fig. 8.
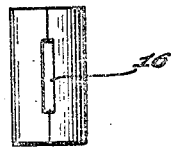
Inventor
GEORGE G. MIZE,
By Ashley Nash
Attorneys Patented Aug. 29, 1933

1,925,055

UNITED STATES PATENT OFFICE 1,925,055

CHAIN

George G. Mize, Indianapolis, Ind., assignor to Diamond Chain and Manufacturing Company, Indianapolis, Ind., a corporation of Indiana Application October 3, 1931. Serial No. 566,673

16 Claims. (Cl. 74—32)

My invention relates to power-transmission chain, and particularly to chain of the roller or bushing type. Such chain is built up of a series of alternately arranged pin-links and roller-links or bushing-links. Each link of the chain comprises a pair of spaced side-bars, the pin-links having pins or rivets which extend between the side-bars of the pin-links and respectively pass through the bushings of the adjacent bushing-links or roller-links. My invention is especially concerned with roller chain, in which each bushing is surrounded by a roller that bears upon the teeth of the associated sprockets. In this application, I shall use the term "bushing-link" to include roller-links, as a roller-link is only a bushing-link with rollers mounted on the bushings.

In the usual roller chain of the type described, the bushings are secured in place in their associated side-bars by being received in holes near the ends of the side-bars. To prevent loosening of the joint between the bushings and side-bars, especially when the chain is to be subjected to severe working conditions and high-speed operation, it is necessary that the fit between the bushings and side-bars be exceedingly tight—so tight, in fact, that a measurable reduction in the internal diameter of the bushing at its ends frequently results.

As the result of this enforced contraction at the ends of the bushing, the material near the center of the bushing is subjected to circumferential compressive stresses which oppose a corresponding reduction in diameter near the middle portion of the bushing. In practice, I have found that these compressive stresses are sufficient to prevent the middle portion of the bushing from contracting to the same extent as do the ends, and the bushing therefore assumes a barrel-shape. The difference between the diameters at the ends and at the middle of the bushing will be slight, being measured in thousandths of an inch; but it is nevertheless demonstrable.

The effect of this distortion of the bushing is to decrease the bearing surface which it presents to the pin or rivet passing through it; as such pin or rivet is substantially cylindrical and of uniform diameter throughout its working length. This decrease in bearing surface is accompanied by a great increase in unit loading and by a great increase in wear.

It is the object of my invention to eliminate the disadvantageous features which follow pressing of the bushing into the side-bars of a chain. More specifically, it is my object to produce a chain in which each bushing may fit tightly within the holes in the side-bars and still retain a substantially uniform diameter throughout its length in order to present a bearing surface of maximum area to the pins or rivets passing through them; and thus to decrease the wear and increase the working life of the chain.

In carrying out my invention, I provide in the bushing and intermediate its length an opening which extends through the bushing-wall, and which is of sufficient length to relieve those compressive stresses which in a circumferentially continuous bushing tend to prevent the center of the bushing from contracting with the ends.

The accompanying drawing illustrates my invention: Fig. 1 is a side elevation of a short length of chain embodying my invention, part of the view being taken in section on the line 1—1 of Fig. 2; Fig. 2 is a plan of the chain illustrated in Fig. 1 in partial section on the line 2—2 of Fig. 1; Figs. 3 and 4 are a plan and side elevation of a strip of material from which a chain-bushing is formed; Fig. 5 is a plan of a similar strip of material of different proportions; Fig. 6 is a plan of a bushing formed from the strip of material shown in Fig. 5; Figs. 7 and 8 are respectively similar to Figs. 5 and 6 showing a bushing of different proportions with an opening of different shape; and Fig. 9 is a transverse section on the line 9—9 of Fig. 2.

The chain illustrated in the drawing is built up of alternately arranged bushing-links and pin-links. Each bushing-link comprises a pair of side-bars 10 which are parallel to each other and spaced laterally of the chain. Between the side-bars 10 of each link there extend two bushings 11 that are tightly received in holes in the ends of the side-bars 10. Surrounding each of the bushings, I have shown a roller 12 which bears upon the teeth of the sprocket with which the chain is associated in use.

Each pin-link comprises a pair of spaced parallel side-bars 14 between which there extend pins or rivets 15 that pass through the bushings of adjacent bushing-links.

A chain so constructed is old. It has had the disadvantage, pointed out above, that if the ends of the bushings 11 have a tight fit within the holes in the side-bars 10 the internal diameter of the bushing is less at its ends than in the middle, thus greatly increasing unit pressures between the bushing and pin at the ends of the bushing and causing excessive wear and elongation of the chain.

As pointed out above, I find it is possible to overcome this disadvantage by providing in the bushing an opening 16 which extends completely through the wall of the bushing near its middle. The opening 16 may vary in shape and may be formed in different ways, depending upon the manner in which the bushings themselves are formed. Such bushings are customarily formed by rolling a strip of flat stock around a cylindrical mandrel by methods which form no part of my present invention.

Such a strip is illustrated in Figs. 3 and 4. In incorporating my invention in a chain having bushings formed from strips such as those illustrated in Figs. 3 and 4, the openings 16 in the walls of the bushings may be provided by notching the ends of the strip as indicated at 17, these notches being so shaped that they register to form an opening of the desired contour when the two ends of the strip are brought together in the formation of the bushing.

In order to secure the maximum benefit of my invention, I find that the length of the opening 16 (measured axially of the bushing) should be more than 50% of the distance between the side-bars of the bushing-link. Preferably, the length of the opening 16 is not less than 70% of the distance between the side-bars.

The width of the opening 16 need be only sufficient to insure that in the assembled link the opposite sides of the opening will not bear against each other and cause those compressive stresses which would otherwise prevent contraction of the middle portion of the bushing. In a formed bushing where the notches 17 are produced by punching, manufacturing considerations demand that the punch which forms the notches 17 have a certain minimum thickness; and this, to an extent, limits the practical minimum width of the opening 16. Since bushings may have different lengths, and since the length of the opening 16 in the bushing is a function of that length, the shape of the opening may depend upon the proportions of the bushings. Thus, for the comparatively long bushing illustrated in Figs. 1 and 2, the opening 16 is considerably elongated, while in the short bushing illustrated in Fig. 6 it is approximately square.

While I prefer to employ an opening of diamond shape, as shown in Fig. 2, other shapes are of course possible. As an example of such other shapes Figs. 7 and 8 illustrate a strip in which the notches 17 are so formed as to produce in the finished bushing a slot 16 of rectangular shape.

In the drawing it will be noted that the bushings are so angularly disposed that the opening in each bushing is directed generally inwardly of the link, or toward the other bushing of the same link. Such an arrangement is preferred, as the pressure between each bushing and the pin passing through it is largely localized against the inner face of that half of the bushing which lies nearest the adjacent end of the bushing-link; and the reduction in bearing area caused by the presence of the opening 16 therefore has no serious consequences when such openings are located as indicated.

It will be apparent from the drawing that in the planes of the side bars 10 the bushing 11 is in effect circumferentially continuous, because the two ends of the strip from which the bushing is formed abut each other. Because of this circumferential continuity in the planes of the side bars 10 the bushing, when pressed into the side bars, is distorted by circumferential compression and not by simple flexure as would be the case if the ends of the strip forming the bushing did not abut each other. Thus, I provide a true press-fit of the bushings within the side-bars 10, this press-fit being sufficient to prevent any angular displacement of a bushing in its associated side-bar, and I thereby eliminate any possibility of wear which would tend to loosen the fit of the bushings in the side-bars.

I claim as my invention:

1. A chain, comprising a series of alternately arranged pin-links and bushing-links, each bushing-link being formed of a pair of spaced side-bars provided with spaced holes and bushings received within said holes, said pin-links having transversely extending members received in the bushings of adjacent bushing-links, and rollers on said bushings, each of said bushings being provided intermediate its length with a strain-relieving opening extending through the bushing-wall but being circumferentially continuous in the planes of the side-bars having a press-fit therein.

2. A chain, comprising a series of alternately arranged pin-links and bushing-links, each bushing-link being formed of a pair of spaced side-bars provided with spaced holes and bushings received within said holes, said pin-links having transversely extending members received in the bushings of adjacent bushing-links, each of said bushings being provided intermediate its length with a strain-relieving opening extending through the bushing-wall but being circumferentially continuous in the planes of the side-bars and having a press-fit therein.

3. A chain, comprising a series of alternately arranged pin-links and bushing-links, each bushing-link being formed of a pair of spaced side-bars provided with spaced holes and bushings received within said holes, said pin-links having transversely extending members received in the bushings of adjacent bushing-links, and rollers on said bushings, each of said bushings being provided intermediate its length with a strain-relieving opening extending through the bushing-wall but being circumferentially continuous in the planes of the side-bars and having a press-fit therein, said opening having a length axially of the bushing in excess of one-half the distance between the side-bars of the bushing-link.

4. A chain, comprising a series of alternately arranged pin-links and bushing-links, each bushing-link being formed of a pair of spaced side-bars provided with spaced holes and bushings received within said holes, said pin-links having transversely extending members received in the bushings of adjacent bushing-links, each of said bushings being provided intermediate its length with a strain-relieving opening extending through the bushing-wall but being circumferentially continous in the planes of the side bars and having a press-fit therein, said opening having a length axially of the bushing in excess of one-half the distance between the side-bars of the bushing-link.

5. A chain, comprising a series of alternately arranged pin-links and bushing-links, each bushing-link being formed of a pair of spaced side-bars provided with spaced holes and bushings received within said holes, said pin-links having transversely extending members received in the bushings of adjacent bushing-links, and rollers on said bushings, each of said bushings being provided intermediate its length with a strain-relieving opening extending through the bushing-wall but being circumferentially continuous in the planes of the side-bars and having a press-fit therein, said opening having a length axially of the bushing not less than seventy percent of the distance between the side-bars of the bushing-link.

6. A chain, comprising a series of alternately arranged pin-links and bushing-links, each bushing-link being formed of a pair of spaced side-bars provided with spaced holes and bushings received within said holes, said pin-links having transversely extending members received in the bushings of adjacent bushing-links, each of said bushings being provided intermediate its length with a strain-relieving opening extending through the bushing-wall but being circumferentially continuous in the planes of the side-bars and having a press-fit therein, said opening having a length axially of the bushing not less than seventy percent of the distance between the side-bars of the bushing-link.

7. A chain, comprising a series of alternately arranged pin-links and bushing-links, each bushing-link being formed of a pair of spaced side-bars provided with spaced holes and bushings received within said holes, said pin-links having transversely extending members received in the bushings of adjacent bushing-links, and rollers on said bushings, each of said bushings being formed of a strip of flat stock formed into cylindrical shape with its ends abutting, the ends of said strip being provided with notches which register to define an opening, the ends of said strip at the sides of said notches abutting each other in the finished bushing whereby said bushing will be circumferentially continuous in the plane of the side bars.

8. A chain, comprising a series of alternately arranged pin-links and bushing-links, each bushing-link being formed of a pair of spaced side-bars provided with spaced holes and bushings received within said holes, said pin-links having transversely extending members received in the bushings of adjacent bushing-links, each of said bushings being formed of a strip of flat stock formed into cylindrical shape with its ends abutting, the ends of said strip being provided with notches which register to define an opening, the ends of said strip at the sides of said notches abutting each other in the finished bushing whereby said bushing will be circumferentially continuous in the plane of the side bars.

9. A chain, comprising a series of alternately arranged pin-links and bushing-links, each bushing-link being formed of a pair of spaced side-bars provided with spaced holes and bushings received within said holes, said pin-links having transversely extending members received in the bushings of adjacent bushing-links, each of said bushings being formed of a strip of flat stock formed into cylindrical shape with its ends abutting, the ends of said strip being provided with notches which register to define an opening, said opening having a length axially of the bushing in excess of one-half the distance between the side-bars of the bushing-link, the ends of said strip at the sides of said notches abutting each other in the finished bushing whereby said bushing will be circumferentially continuous in the plane of the side-bars.

10. A chain, comprising a series of alternately arranged pin-links and bushing-links, each bushing-link being formed of a pair of spaced side-bars provided with spaced holes and bushings received within said holes, said pin-links having transversely extending members received in the bushings of adjacent bushing-links, each of said bushings being formed of a strip of flat stock formed into cylindrical shape with its ends abutting, the ends of said strip being provided with notches which register to define an opening, said opening having a length axially of the bushing not less than seventy percent of the distance between the side-bars of the bushing-link, the ends of said strip at the sides of said notches abutting each other in the finished bushing whereby said bushing will be circumferentially continuous in the plane of the side bars.

11. A chain, comprising a series of alternately arranged pin-links and bushing-links, each bushing-link being formed of a pair of spaced side-bars provided with spaced holes and bushings received within said holes, said pin-links having transversely extending members received in the bushings of adjacent bushing-links, and rollers on said bushings, each of said bushings being provided intermediate its length with a strain-relieving opening extending through the bushing-wall but being circumferentially continuous in the planes of the side-bars and having a press-fit therein, the openings in said bushings being directed generally inwardly of the bushing-links.

12. A chain, comprising a series of alternately arranged pin-links and bushing-links, each bushing-link being formed of a pair of spaced side-bars provided with spaced holes and bushings received within said holes, said pin-links having transversely extending members received in the bushings of adjacent bushing-links, each of said bushings being provided intermediate its length with a strain-relieving opening extending through the bushing-wall but being circumferentially continuous in the planes of the side-bars and having a press-fit therein, the openings in said bushings being directed generally inwardly of the bushing-links.

13. A chain, comprising a series of alternately arranged pin-links and bushing-links, each bushing-link being formed of a pair of spaced side-bars provided with spaced holes and bushings received within said holes, said pin-links having transversely extending members received in the bushings of adjacent bushing-links, each of said bushings being provided intermediate its length with a strain-relieving opening extending through the bushing-wall but being circumferentially continuous in the planes of the side-bars and having a press-fit therein, said opening having a length axially of the bushing in excess of one-half the distance between the side-bars of the bushing-link, the openings in said bushings being directed generally inwardly of the bushing links.

14. A bushing link for power-transmission chains, comprising two spaced side-bars having holes near their ends and bushings received in such holes, each of said bushings being provided intermediate its length with a strain-relieving opening directed generally inwardly of the link but being circumferentially continuous in the planes of the side-bars and having a press-fit therein.

15. A bushing link for power-transmission chains, comprising two spaced side-bars having holes near their ends and bushings received in such holes, each of said bushings being provided intermediate its length with a strain-relieving opening but being circumferentially continuous in the planes of the side-bars and having a press-fit therein, said opening having a length axially of the bushing in excess of one-half the distance between the side-bars of the link.

16. A bushing link for power-transmission chains, comprising two spaced side-bars having holes near their ends and bushings received in such holes, each of said bushings being provided intermediate its length with a strain-relieving opening but being circumferentially continuous in the planes of the side-bars and having a press-fit therein, said opening having a length axially of the bushing greater than seventy percent of the distance between the side-bars of the link.

GEORGE G. MIZE.